United States Patent Office 2,936,323
Patented May 10, 1960

2,936,323

CHEMICAL COMPOSITION AND PROCESS

Jamal S. Eden, Bath, Ohio, assignor to Diamond Alkali Company, Cleveland, Ohio, a corporation of Delaware No Drawing. Application October 16, 1957
Serial No. 690,445

10 Claims. (Cl. 260—558)

This invention relates to novel haloamides of the formula

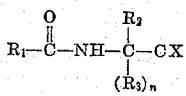

wherein $R_1$ is selected from the group consisting of alkyl radicals, e.g., methyl, ethyl, propyl, butyl and the like, aryl radicals, typically phenyl or naphthyl, aralkyl radicals, such as alkyl-substituted phenyl radicals, e.g., monomethyl and dimethyl substituted phenyl radicals, alkaryl radicals such as benzyl and phenethyl radicals, halogen-substituted alkyl radicals of not more than 30 carbon atoms, halogen-substituted aryl radicals; and X is selected from the group consisting of hydrogen atoms and halogen atoms, i.e., chlorine, fluorine, bromine and iodine, wherein chlorine is preferred; $R_2$ and $R_3$ are selected from the group consisting of hydroxy radicals, hydrogen atoms and oxygen atoms; and $n$ is a number from 0 to 1, inclusive, $n$ being 0 when $R_2$ is oxygen.

Illustrative of specific compounds of this type are:

N-(2,2,2-trichloro-1-hydroxyethyl)-3,4-dichlorobenzamide

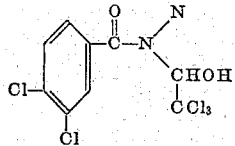

N-(2,2,2-trichloro-1-hydroxyethyl)-2,4-dichlorobenzamide

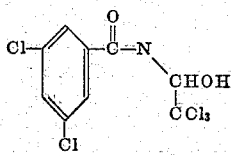

N-(dichloroacetyl)-trichlorobenzamide

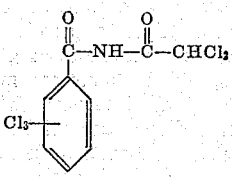

N-(1-hydroxy-2,2,2-trichloroethyl)-p-t-butylbenzamide

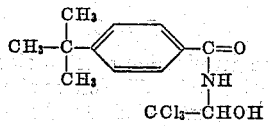

Compounds of the above type may be employed in a variety of applications, chemical intermediates, biological or otherwise. When employed as biologically active materials, it will be understood, of course, that such compounds may be utilized in diverse formulations, both liquid and solid, including finely-divided powders and granular materials, as well as liquids, e.g., solutions, concentrates, emulsifiable concentrates, slurries, and the like, depending upon the application intended and the formulation media desired.

Thus, it will be appreciated that compounds of this invention may be employed to form biologically active compositions containing such compounds as essential active ingredients thereof, which compositions may also include finely-divided dry or liquid diluents, extenders, fillers, conditioners including various clays, diatomaceous earth, talc, spent catalyst, alumina silica materials and liquids, solvents, diluents, etc. as water and various organic liquids such as kerosene, acetone, benzene, toluene, xylene, and other petroleum distillate fractions or mixtures thereof.

When liquid formulations are employed or dry materials prepared which are to be used in liquid form, it is desirable in certain instances additionally to employ a wetting, emulsifying or dispersing agent to facilitate use of the formulation, typically Triton X–155 (alkyl aryl polyether alcohol, U.S. Patent 2,504,064).

The term "carrier" as employed throughout the specification and claims is intended to refer broadly to the material constituting a major proportion of a biologically active or other formulation, and, hence, include finely-divided materials, both liquids and solids, as aforementioned, conventionally used in such application.

Compounds of this invention generally may be formed by reacting a compound selected from the group consisting of acyl amides, e.g., chloroacetamide, and benzamides, typically p-t-butylbenzamide, 3,4-dichlorobenzamide, trichlorobenzamide and 2,4-dichlorobenzamide, with a compound of the formula

wherein R is selected from the group consisting of alkyl and halogen-substituted radicals. The reaction is preferably carried out by heating the reactants to an elevated temperature, typically 70°–100° C. Generally, equimolar amounts of the desired reactants are combined, preferably at an elevated temperature until the reaction is complete.

In order that those skilled in the art may more completely understand the present invention and the preferred methods by which the same may be carried into effect, the following specific examples are offered:

EXAMPLE I

Part A

*Preparation of 1-(alpha-chloroacetamido)-2,2,2-trichloroethanol.*—In a covered container 18.7 gm. (0.2 mol) of alpha-chloroacetamide is heated on a steam bath with 50 ml. (0.5 mol) of anhydrous chloral. After heating for about 2 minutes, solution is complete, heating is stopped, and white crystals are formed. The cover is then removed and the product is washed thoroughly with water, filtered, and dried for an hour at 70° C. By this procedure 47 gm. of crystals melting at 135°–145° C. is obtained. This crude product is crystallized twice from a methanol-water mixture to obtain a product melting at 143.5°–145.0° C. This product has the following elemental analysis, indicating preparation of the desired $C_4H_5Cl_4NO_2$:

| Element | Calculated, percent by wgt. | Actual, percent by wgt. |
|---|---|---|
| C | 19.95 | 20.00 |
| H | 2.09 | 2.10 |
| Cl | 58.9 | 55.8 |

Part B

Application of the product of Part A to test variety, tomato, corn, and bean plants in amounts of 250 mg. per 4″ clay pot results in the killing of each plant, thus indicating a high degree of herbicidal activity.

Part C

Application of the product of Part A in the control of Early blight of tomatoes at concentrations of 2000 and 400 p.p.m. produces a percentage control of 83 and 97%, respectively, the higher concentration causing burning of the plant.

Part D

The product of Part A is applied as a pre-emergent herbicide to soil at a rate of 8 and 16 lbs. per acre. The resultant estimated percentage stands of broadleaf and grass plants at 8 lbs. per acre are 100 and 20, respectively, the grass being somewhat stunted, and an estimated percentage stand at 16 lbs. per acre of 75 and 5, with a higher degree of stunting of the grass.

Part E

The product of Part A is formulated into a 25% wettable powder and dispersed in water to produce a concentration of 1% of the product of Part A. This formulation is applied to Cranberry bean plants by dipping the plants into the solution. After the treated plants are dried, untreated Southern armyworms are caged thereon. After 48 hours, 100% insect mortality (7% feeding) and severe plant injury are observed, while no insect mortality (100% feeding) is observed on an untreated plant.

EXAMPLE II

Part A

Preparation of N-(2,2,2-trichloro-1-hydroxyethyl)-p-t-butylbenzamide.—35.6 gm. (0.2 mol) of p-t-butyl benzoic acid and 15 ml. (0.22 mol) of thionyl chloride are heated together under reflux on a steam bath for 75 minutes in a flask equipped with a reflux condenser, agitator, and thermometer. The reflux condenser is then removed and heating is continued 15 minutes longer. The resultant crude p-t-butyl benzoyl chloride is cooled in an ice water bath and 75 ml. of 28% ammonium hydroxide (0.6 mol) solution is added portionwise with cooling. The resultant material is filtered, washed with water and dried, yielding 34 gm. of p-t-butylbenzamide melting at 165°–170° C. 33 gm. of this material is then heated with 20 ml. of chloral on a steam bath for two hours and allowed to cool, triturated with water twice, filtered, washed and dried, yielding 50.9 gm. of desired product, melting at 150°–153° C. Chemical analysis indicates preparation of the desired $C_{13}H_{16}O_2Cl_3$ and is as follows:

| Element | Calculated, percent by wgt. | Actual, percent by wgt. |
| --- | --- | --- |
| C | 48.5 | 48.3 |
| H | 5.1 | 5.0 |
| Cl | 30.9 | 30.5 |

Part B

Using the product of Part A, glass slide tests are conducted against the organism *Alternaria oleracea* and *Monolinia fructicola*. The ED 50 values, i.e., concentrations at which germination of one-half the organisms is inhibited, obtained with these organisms respectively are between 100 and 1000 p.p.m., thus indicating a marked degree of fungicidal activity.

EXAMPLE III

Part A

Preparation of N-(2,2,2-trichloro-1-hydroxyethyl)-3,4-dichlorobenzamide.—In a flask 57.0 gm. (0.3 mol) of 3,4-dichlorobenzamide, M.P. 146°–149° C., is refluxed for 7 hours with 60.0 ml. (0.6 mol) of chloral, and allowed to cool overnight. The resulting yield, after washing with hexane and drying, is 98.0 gm. of crude crystals, M.P. about 150°–160° C. This product after washing with chloroform and several crystallizations from ethyl acetate had a melting point of 152°–155° C. This product has the following elemental analysis, indicating preparation of the desired $C_9H_6Cl_5NO_2$:

| Element | Calculated, percent by wgt. | Actual, percent by wgt. |
| --- | --- | --- |
| C | 32.25 | 32.63 |
| H | 1.78 | 1.71 |

EXAMPLE IV

Part A

Preparation of N-(2,2,2-trichloro-1-hydroxyethyl)-2,4-dichlorobenzamide.—30.0 gm. (0.158 mol) of 2,4-dichloro-benzamide, M.P. 197°–198° C., is heated in a flask with 25.0 ml. (0.25 mol) chloral for 8 hours under a reflux condenser on a steam bath, and allowed to cool overnight. The resultant product is washed with water and recrystallized using methanol, yielding about 45 gm., M.P. 152°–155° C. Two further recrystallizations from methanol-water solution yields 34.0 gm. of white crystals, M.P. 155°–157° C. Chemical analysis indicates preparation of the desired $C_9H_6Cl_5NO_2$ and is as follows:

| Element | Calculated, percent by wgt. | Actual, percent by wgt. |
| --- | --- | --- |
| C | 32.12 | 32.39 |
| H | 1.79 | 1.62 |

Part B

Concerning the uses of the compounds prepared in Part A, a tomato foliage disease test is run measuring the ability of the test compound to protect tomato foliage against infection of the early blight fungus *Alternaria solani* and the late blight fungus *Phytophthora infestans*. The method employs tomato plants 5 to 7 inches high of the variety Bonny Best. Duplicate plants, one set for each test fungus, are sprayed with 100 ml. of the test formulation at a toxicant concentration of 400 p.p.m. (5% acetone, 0.01% Triton X–155, the balance water) using 40 lbs. air pressure while being rotated on a turntable in a spray chamber. After the spray deposit is dry, the treated plants and comparable untreated controls (sprayed with formulation less toxicant) are sprayed with a spore suspension containing approximately 20,000 conidia of *A. solani* per ml. or 150,000 sporangia of *P. infestans* per ml. The atomizer used delivers 20 ml. in 30 seconds.

The thus-treated plants are held in a saturated water vapor atmosphere for 24 hours at 70° F. for early blight and 60° F. for late blight to permit spore germination and infection before removal to a greenhouse. After two to four days, lesion counts are made on the three uppermost fully expanded leaves. The data are converted to percentage disease control based on the number of lesions obtained on the control plant. This test shows that at 400 p.p.m. a 79% disease control was obtained. This indicates a high degree of fungicidal activity.

Part C

Further spore germination tests on glass slides are conducted via the test tube dilution method adopted from the procedure recommended by the American Phytopathological Society's Committee on Standardization of Fungicidal Tests. With this procedure, the product of Part A, in aqueous formulations at concentrations of 1000, 100, 10 and 1.0 p.p.m., is tested for its ability to inhibit germination of spores from 7 to 10 day old cultures of *A. oleracea* and *M. fructicola*. Germination records are taken after 20 hours of incubation at 22° C. by counting 100 spores. Using this test the compound inhibited germination of half the spores (ED–50 value) at a concentration of 10 to 100 p.p.m., indicating a high degree of fungicidal activity.

EXAMPLE V

Part A

*Preparation of N-(dichloroacetyl)-trichlorobenzamide.*—33.8 gm. (0.15 mol) of mixed isomers of trichlorobenzoic acid is treated with 12.0 ml. (0.17 mol) of thionyl chloride to prepare the acid chloride, then with 50.0 ml. (0.4 mol) of 28% ammonium hydroxide solution to form the amide. The trichlorobenzoic acid and the thionyl chloride are heated together under reflux on a steam bath for 75 minutes. Then the reflux condenser is removed and heating is continued 15 minutes longer. The resulting acid chloride is cooled in an ice water bath, while 75 ml. of the 28% ammonium hydroxide solution is added portionwise with cooling. The sample is then filtered, washed with water and dried. The resulting product is reacted with 18 ml. of chloral. After 7 hours heating, the mixture is cooled and the mass crystallizes. The resultant solid is washed with water and dissolved in methanol, filtered and precipitated with water, after which it is dried in a vacuum dessicator to obtain 34 gm. of the desired $C_9H_4Cl_5NO_2$.

Part B

Using the fungicidal test referred to in Example IV, Part B, a 400 p.p.m. concentration of the product of Part A exhibits a 95% control of the early blight. Using the fungicidal test referred to in Example II, Part B, the ED–50 concentration is 10–100 p.p.m. for the *A. oleracea* and 100–1000 p.p.m. for the *M. fructicola*. These two tests show that the test compound exhibits fungicidal activity.

Part C 10 cc. of a solution comprising 1% of the product of Part A of this example, 0.01% Triton X–155, 5% acetone, and the remainder water, is added to soil containing young growing tomato plants and also sprayed on leaves of the plants. The test chemical is brought in contact with beans and corn in the same manner. After one month, the plants are observed and effects noted. Results showed that the product of Part A of this example modified the tomato plants and stunted the beans and the corn.

EXAMPLE VI

Part A

*Preparation of chloralstearamide.*—85. g. (0.3 mol) stearamide (90% stearamide, 6% palmitamide, and 4% oleamide) is ground in a mortar with 50 g. (0.3 mol) chloral hydrate followed by heating in a boiling water bath for about 4 to 6 hours, until reaction completion. The resultant waxy solid is dissolved in hot toluene, filtered and cooled, and then dissolved in hexane from which the waxy solid separates via a slow filtration. The product is then dried at 45–50° C. The desired $C_{20}H_{38}Cl_3NO_2$ melts at about 105° C. and has the following analytical data:

| Element | Actual, Percent by Wgt. | Calculated, Percent by Wgt. |
|---|---|---|
| C | 57.31 | 55.66 |
| H | 9.29 | 8.84 |
| Cl | 22.5 | 24.7 |

Part B

In order to demonstrate insecticidal activity adult 2-spotted spider mites, *Tetranychus bimaculatus*, maintained on Tendergreen beans under controlled controlled conditions are transferred from a stock culture by leaf cuttings to uninfested seed leaves of bean plants in 2½″ pots the day prior to testing. A formulation of the test chemical (2000 p.p.m. product of Part A, 5% acetone, 0.01% Triton X–155, the balance water) is sprayed onto the infested test plants. Mortality counts are made after two days showing significant control of the insect.

Part C

Fungicidal action is evaluated through a tomato foliage disease test measuring the ability of the test compounds to protect tomato foliage against infection by the early blight fungus, *Alternaria solani*. Using the general procedure referred to in Example IV, Part A, the chloralstearamide of the present example shows 76% and better than 35% disease control at the 2000 and 400 p.p.m. concentrations, respectively.

Part D

Further fungicidal utility is demonstrated by the ability of the test compound to protect tomato plants against the late blight fungus, *Phytophthora infestans*. This method given in Example IV, Part B, and using the product of Part A of the present example, significant disease control is shown at concentrations of 2000 p.p.m. and 400 p.p.m.

Part E

To evaluate the effect of the test chemical upon the germination of seeds in soil, a mixture of seed of six crop plants is broadcast in 8 x 8 x 2″ metal cake pans filled to within ½″ of the top with composted greenhouse soil. The seed is uniformly covered with about ¼″ soil and watered. After 24 hours, 80 ml. of an aqueous test formulation containing 320 mg. test compound is sprayed at 10 pounds air pressure uniformly over the surface of the pan. This is equivalent to 64 pounds per acre. The seed mixture contains representatives of 3 broadleafs: turnip, flax, and alfalfa, and three grasses: wheat, millet, and rye grass. Two weeks after treatment records are taken on the seedling stand as compared to the control. Using this procedure, results show 90% stand for the broadleaf species and 65% stand for the grass, demonstrating selective herbicidal action.

EXAMPLE VII

Part A

*Preparation of chlorallauramide.*—59.7 g. (0.3 mol) lauramide (95% lauramide, 4% tetradecamide, 1% decenamide) is ground in a mortar with 50 g. (0.3 mol) chloral hydrate and the mixture is heated in a boiling water bath for about six hours, until reaction completion. The resultant waxy solid is dissolved in hot toluene, filtered, cooled, stirred into hexane and the waxy solid filtered off. This is followed by drying at 45–50° C. and allowed to cool in an evacuated desiccator over sodium hydroxide and calcium chloride for 3 hours. The resultant 79.5 g. melts at about 110° C. The following analytical data indicates preparation of the desired $C_{14}H_{26}Cl_3NO_2$:

| Element | Actual, Percent by Wgt. | Calculated, Percent by Wgt. |
|---|---|---|
| C | 50.5 | 48.5 |
| H | 7.59 | 7.58 |
| Cl | 29.9 | 30.65 |

Part B

In order to demonstrate insecticidal activity, male German cockroaches, *Blattela germanica*, 8 to 9 weeks old are anesthetized with carbon dioxide to facilitate handling and then dipped in a test formulation (2000 p.p.m. product of Part A, 5% acetone, 0.01% Triton X-155, the balance water) for 10 seconds, removed, freed of excess liquids, and caged. Two lots of 10 insects each are exposed to this formulation and mortality observations are recorded after three days. Using this procedure at the above concentration, results indicate the above test compound is significantly fatal to the male German cockroach.

Part C

Employing the spider mite insecticidal evaluation given in Example VI, Part B, the product of Part A of Example VII demonstrated significant control on the infested bean leaves.

Part D

Fungicidal utility is demonstrated using the procedure given in Example IV, Part B, wherein disease control of 16% and 87% is observed for the late blight fungus at 2000 p.p.m. and 400 p.p.m. concentrations, respectively.

Part E

Using the herbicidal test referred to in Example VI, Part E, the chlorallauramide of Example VII shows seedling stands of 75% for the broadleaf crop and 15% for the grass crops.

It is to be understood that although the invention has been described with specific reference to particular embodiments thereof, it is not to be so limited since changes and alterations therein may be made which are within the full intended scope of this invention as defined by the appended claims.

What is claimed is:

1. Compounds represented by the structure:

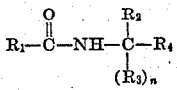

wherein $R_1$ is a chlorophenyl radical; $R_2$ and $R_3$ are selected from the group consisting of hydroxy radicals, hydrogen atoms, and oxygen atoms; $n$ is a number selected from the group consisting of 0 and 1, inclusive, $n$ being 0 when $R_2$ is oxygen; $R_4$ is a halo lower alkyl radical; said radicals containing no more than 30 carbon atoms.

2. N - (2,2,2 - trichloro - 1 - hydroxyethyl) - 2,4 - dichlorobenzamide.
3. N - (2,2,2 - trichloro - 1 - hydroxyethyl) - 3,4, - dichlorobenzamide.
4. N - (2,2,2 - trichloro - 1 - hydroxyethyl) - p - t - butylbenzamide.
5. N-(dichloroacetyl)-trichlorobenzamide.
6. The method of preparing an amide of the formula:

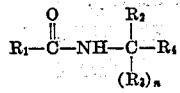

which comprises chemically reacting a compound represented by the structure:

with a compound represented by the structure:

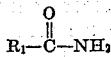

wherein $R_1$ is a chlorophenyl radical; $R_2$ and $R_3$ are selected from the group consisting of hydroxy radicals, hydrogen atoms, and oxygen atoms; $n$ is a number selected from the group consisting of 0 and 1, inclusive, $n$ being 0 when $R_2$ is oxygen; $R_4$ is a halo lower alkyl radical; said radicals containing no more than 30 carbon atoms.

7. The method of preparing N-(2,2,2-trichloro-1-hydroxyethyl)-p-t-butylbenzamide which comprises reacting p-t-butylbenzamide and chloral.
8. The method of preparing N-(2,2,2-trichloro-1-hydroxyethyl) - 3,4 - dichlorobenzamide which comprises chemically reacting 3,4-dichlorobenzamide with chloral.
9. The method of preparing N-(2,2,2-trichloro-1-hydroxyethyl)-2,4-dichlorobenzamide which comprises reacting 2,4-dichlorobenzamide with chloral.
10. The method of preparing N-(dichloroacetyl)-trichlorobenzamide which comprises treating the mixed isomers of trichlorobenzamide with chloral.

References Cited in the file of this patent

UNITED STATES PATENTS

| | | |
|---|---|---|
| 1,025,889 | Sultzberger | May 7, 1912 |
| 2,760,977 | Feuer et al. | Aug. 28, 1956 |

FOREIGN PATENTS

| | | |
|---|---|---|
| 198,715 | Germany | June 2, 1908 |

UNITED STATES PATENT OFFICE

CERTIFICATE OF CORRECTION

Patent No. 2,936,323                                                May 10, 1960

Jamal S. Eden

It is hereby certified that error appears in the printed specification of the above numbered patent requiring correction and that the said Letters Patent should read as corrected below.

Column 1, lines 17 to 20, the formula should appear as shown below instead of as in the patent:

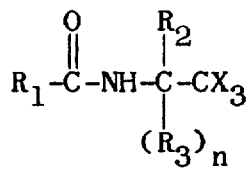

same column 1, lines 37 to 43, the formula should appear as shown below instead of as in the patent:

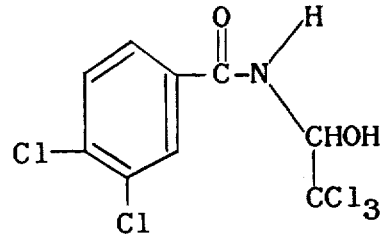

same column 1, lines 45 to 50, the formula should appear as shown below instead of as in the patent:

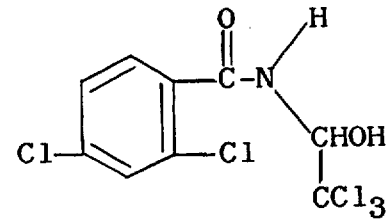

column 5, line 54, for "85. g." read -- 85 g. --.

Signed and sealed this 13th day of December 1960.

(SEAL)
Attest:

KARL H. AXLINE                                      ROBERT C. WATSON
Attesting Officer                              Commissioner of Patents